(12) United States Patent
Choi

(10) Patent No.: US 11,674,567 B2
(45) Date of Patent: Jun. 13, 2023

(54) ELECTRIC VEHICLE TRANSMISSION SYSTEM

(71) Applicant: DRIVETECH CO., LTD., Bucheon-si (KR)

(72) Inventor: Yun Yong Choi, Gimpo-si (KR)

(73) Assignee: DRIVETECH CO., LTD., Bucheon-si (KR)

( * ) Notice: Subject to any disclaimer, the term of this patent is extended or adjusted under 35 U.S.C. 154(b) by 260 days.

(21) Appl. No.: 17/060,617

(22) Filed: Oct. 1, 2020

(65) Prior Publication Data

US 2021/0071741 A1    Mar. 11, 2021

Related U.S. Application Data

(63) Continuation of application No. PCT/KR2018/014951, filed on Nov. 29, 2018.

(30) Foreign Application Priority Data

Apr. 2, 2018   (KR) .................. 10-2018-0038164
May 29, 2018   (KR) .................. 10-2018-0060948

(51) Int. Cl.
*F16H 3/72*   (2006.01)
*F16H 63/30*  (2006.01)
*F16H 3/54*   (2006.01)

(52) U.S. Cl.
CPC ............... *F16H 3/725* (2013.01); *F16H 3/54* (2013.01); *F16H 63/302* (2013.01);
(Continued)

(58) Field of Classification Search
CPC . F16H 3/72; F16H 3/724; F16H 3/725; F16H 3/46–54; F16H 2200/0021;
(Continued)

(56) References Cited

U.S. PATENT DOCUMENTS 6,979,275 B2 * 12/2005 Hiraku ............... F16H 3/54
                                                    475/214
11,028,906 B2 * 6/2021 Torii ............... B60K 17/08
(Continued)

FOREIGN PATENT DOCUMENTS

JP      03-117752 A     5/1991
JP      2002-340163 A   11/2002
(Continued)

OTHER PUBLICATIONS

International Search Report issued in PCT/KR2018/014951; dated Mar. 7, 2019.
(Continued)

*Primary Examiner* — Erin D Bishop
(74) *Attorney, Agent, or Firm* — Studebaker & Brackett PC

(57) ABSTRACT

An electric vehicle transmission system is disclosed. The electric vehicle transmission system is employing a planetary gear type speed reducer so as to implement first-gear shifting, second-gear shifting, or reverse shifting, thereby enabling reduced manufacturing costs of an electric vehicle while increasing the fuel efficiency of the electric vehicle, and also employing the planetary gear type speed reducer so as to implement forward and reverse shifting, thereby enabling reduced manufacturing costs of the electric vehicle while increasing the fuel efficiency of the electric vehicle.

18 Claims, 6 Drawing Sheets

(52) U.S. Cl.
CPC ............... *F16H 2200/0021* (2013.01); *F16H 2200/0034* (2013.01); *F16H 2200/2005* (2013.01); *F16H 2200/2035* (2013.01); *F16H 2200/2082* (2013.01)

(58) Field of Classification Search
CPC ..... F16H 2200/0034; F16H 2200/2005; F16H 2200/2035; F16H 2200/2066; F16H 2200/2082
See application file for complete search history.

(56) References Cited

U.S. PATENT DOCUMENTS

| | | |
|---|---|---|
| 2013/0130856 A1 | 5/2013 | Li |
| 2014/0148292 A1 | 5/2014 | Lee |
| 2015/0240917 A1* | 8/2015 | Vermeulen ............. B60K 6/387 |
| | | 903/910 |

FOREIGN PATENT DOCUMENTS

| | | |
|---|---|---|
| KR | 10-2012-0055335 A | 5/2012 |
| KR | 10-1282691 B1 | 7/2013 |
| KR | 10-1400877 A | 5/2014 |
| KR | 10-2017-0012829 A | 2/2017 |
| KR | 10-2017-0107825 A | 9/2017 |

OTHER PUBLICATIONS

Office Action issued in KR 10-2018-0038164; mailed by the Korean Intellectual Property Office dated May 29, 2019 with English language translation.

Office Action issued in KR 10-2018-0060948; mailed by the Korean Intellectual Property Office dated Jul. 26, 2019 with English language translation.

\* cited by examiner

ELECTRIC VEHICLE TRANSMISSION SYSTEM

CROSS-REFERENCE TO RELATED APPLICATIONS

The present application is a continuation of International Patent Application No. PCT/KR2018/014951, filed on Nov. 29, 2018, which is based upon and claims the benefit of priority to Korean Patent Application Nos. 10-2018-0038164 filed on Apr. 2, 2018, 10-2018-0060948 filed on May 29, 2018. The disclosures of the above-listed applications are hereby incorporated by reference herein in their entirety.

BACKGROUND

Embodiments of the inventive concept described herein relate to an electric vehicle transmission system, and more particularly, relate to an electric vehicle transmission system capable of performing a control operation in the type of a planetary gear.

As an oil price and regulations are globally increased, improvement in fuel efficiency and eco-friendliness has become key items in developing vehicles. Accordingly, advanced car makers are focusing their efforts on developing technologies for improving fuel efficiency and for eco-friendless.

Among them, a representative example is an electric vehicle. Hereinafter, an electric vehicle refers to a vehicle that is driven using an electric motor, and is understood as a vehicle, such as a hybrid vehicle, a fuel cell vehicle, and an electric battery vehicle, that accumulates electricity and drives the motor through the electricity to transmit the driving force to the vehicle.

In general, according to the driving scheme using such a motor, a reducer is provided to reduce the rotational speed of the motor to be matched with the driving speed of the vehicle. The reducer further includes a gear between an input-shaft gear connected to an input shaft of the motor and an output-shaft gear connected to a vehicle wheel to form an additional reduction gear ratio, such that the rotational speed of the input shaft is output, in the reduced state, to the output shaft In other words, a conventional second-stage transmission for an electric vehicle adopts a gear-train type reducer, and the driving force of the motor is generated to first-stage driving force and second-stage driving force through such a reducer.

Meanwhile, the conventional second-stage transmission for electric vehicles implements the reverse of the electric vehicle by driving the motor in reverse.

However, the conventional second-stage transmission for the electric vehicle adopts the structure of a gear-train type reducer.

In other words, the conventional second-stage transmission for the electric vehicle is expanded in size and increased in weight, because of adopting the structure of a gear-train type reducer.

Accordingly, the fuel efficiency of the electric vehicle adopting the structure of the gear-train type reducer may be reduced.

The gear-train type of adding a gear train one more is adopted in addition to degrading in fuel efficiency, which acts as an obstacle in terms of production costs or optimized performance design of the conventional second-stage transmission for the electric vehicle.

SUMMARY

A first embodiment of the inventive concept provides an electric vehicle transmission system having a reverse control function, capable of realizing first-gear shifting, second-gear shifting, or reverse-gear shifting by adopting a reducer in a planetary gear type, thereby increasing the fuel efficiency of an electric vehicle while reducing production costs of the electric vehicle, of performing fast start and soft and rapid gear-shifting of the electric vehicle due to a power transmission structure to significantly softly reduce the variation in torque transmitted from a driving motor to an output shaft, such that the electric vehicle is silently running, and of preventing an impact from being exerted on an internal part, such as a driving motor, of the transmission system.

A second embodiment of the inventive concept provides an electric vehicle transmission system having a reverse control function, capable of realizing forward-gear shifting and reverse-gear shifting by adopting the reducer in the planetary gear type, thereby increasing the fuel efficiency of the electric vehicle while reducing the production costs of the electric vehicle, of allowing the rapid start of the electric vehicle and the soft and rapid gear-shifting of the electric vehicle to provide a pleasant driving environment to the driver, of reducing the height of the electric vehicle to balance the weight of the vehicle due to the structure in which the forward-gear shifting part and the reverse-gear shifting controlled by the shifting control unit are distributed into the left and right sides of the planetary gear carrier, and of providing the optimized compact mounting structure to ensure the minimum ground clearance for satisfying vehicle regulations.

A third embodiment of the inventive concept provides a longitudinal-type electric vehicle transmission system capable of realizing, as the electric vehicle, a heavy vehicle requiring great power, a large-size vehicle such as a truck or a bus, and a sports vehicle requiring a higher speed, vehicle center balance, and higher rotational inertia.

The objects of the inventive concept are not limited to the above, but other effects, which are not mentioned, will be apparently understood to those skilled in the art.

According to an exemplary embodiment, a transmission system for an electric vehicle includes a power source to provide power, an input shaft mounted to receive rotational force from the power source, a ring gear carrier connected to the input shaft to rotate as the input shaft rotates, a ring gear connected to the ring gear carrier to rotate as the ring gear carrier rotates, a planetary gear mounted to be engaged with an inner portion of the ring gear and to rotate, a planetary gear carrier connected to the planetary gear to rotate as the planetary gear rotates, an output shaft connected to the planetary gear carrier to rotate together with the planetary gear carrier, a sun gear mounted to be engaged with an inner portion of the planetary gear to rotate and connected to the output shaft such that the output shaft is rotatable, and a first-gear shifting part coupled to the sun gear to stop rotation of the sun gear to make first-gear shifting.

According to another exemplary embodiment, a transmission system for an electric vehicle includes a power source to provide power, an input shaft mounted to receive rotational force from the power source, a sun gear shaft-connected to the input shaft to rotate, a planetary gear mounted to be engaged with an outer portion of the sun gear, a planetary gear carrier to support the planetary gear such that the planetary gear is rotatable on the input shaft, an output shaft connected to the planetary gear carrier, a ring gear mounted on an outer portion of the planetary gear carrier and toothed to the planetary gear, a ring gear carrier to support the ring gear such that the ring gear is rotatable on the output shaft, a rotation control part to allow the ring gear to rotate only in one direction, a forward-gear shifting part fixedly coupled to the input shaft to rotate together with the sun gear and coupled to or decoupled from the planetary gear carrier to adjust forward-gear shifting, a reverse-gear shifting part rotatably coupled to the output shaft and coupled to or decoupled from the ring gear carrier to adjust reverse-gear shifting, and a shifting control unit to control the forward-gear shifting part not to be coupled to the planetary gear carrier and to control the reverse-gear shifting part not to be coupled to the ring gear carrier, in first-gear shifting.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
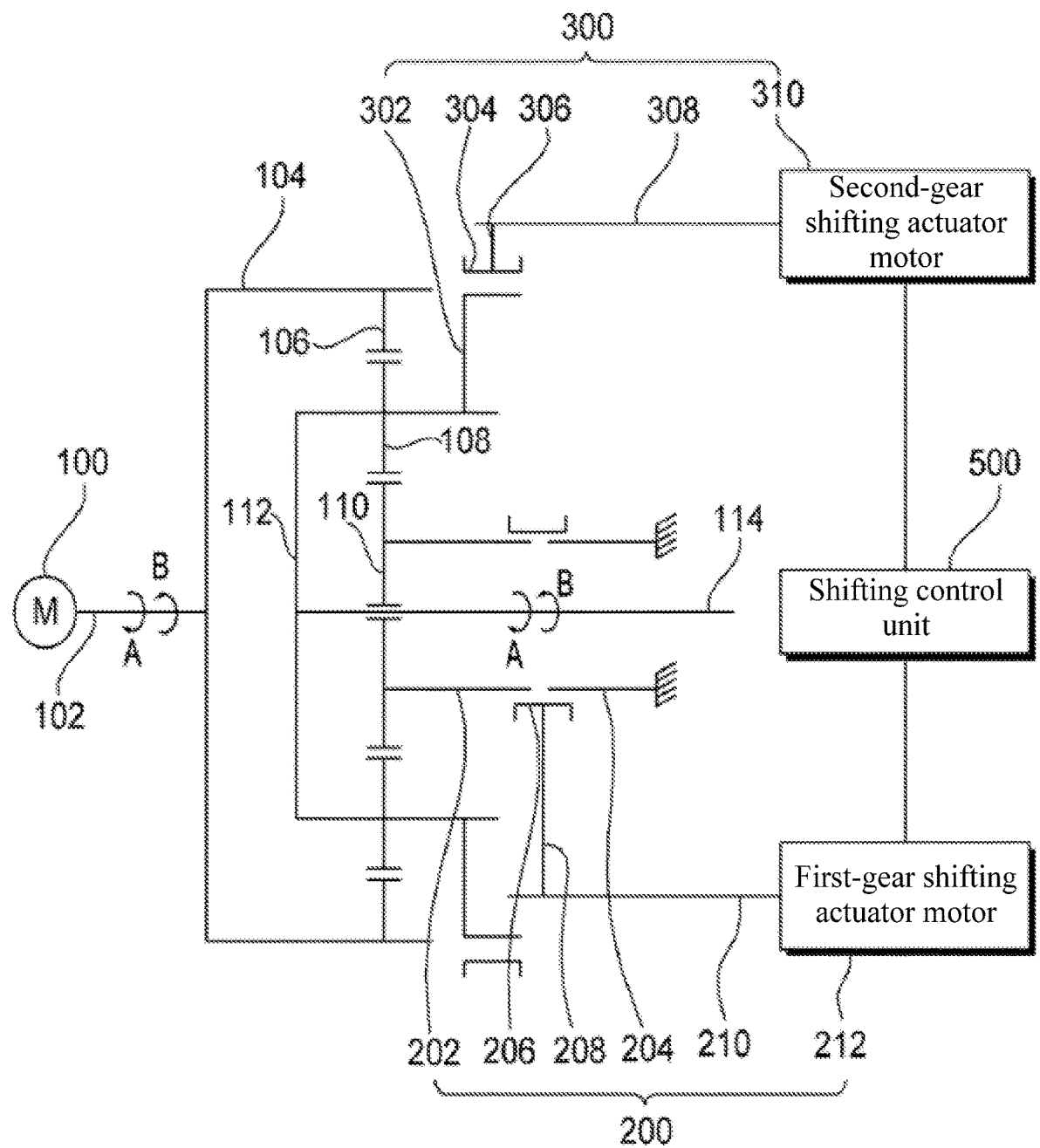
FIG. 1 is a view illustrating the configuration of an electric vehicle transmission system, according to a first embodiment of the inventive concept, in which a first-gear shifting state and a reverse-gear shifting state through first-gear shifting are illustrated.

Advantage points and features of the inventive concept and a method of accomplishing thereof will become apparent from the following description with reference to the following figures, wherein embodiments will be described in detail with reference to the accompanying drawings. However, the inventive concept may be embodied in various different forms, and should not to be construed as being limited only to the illustrated embodiments. Rather, these embodiments are provided as examples so that the inventive concept will be thorough and complete, and will allow those skilled in the art to fully understand the scope of the inventive concept. The inventive concept may be defined by scope of the claims.

The terminology used herein is provided for explaining embodiments, but the inventive concept is not limited thereto. As used herein, the singular terms are intended to include the plural forms as well, unless the context clearly indicates otherwise. Furthermore, it will be further understood that the terms "comprises", "comprising," "includes" and/or "including", when used herein, specify the presence of stated components, but do not preclude the presence or addition of one or more other components. The same reference numerals will be assigned to the same component throughout the whole specification, and "and/or" refers to that components described include not only individual components, but at least one combination of the components. It will be understood that, although the terms "first", "second", etc., may be used herein to describe various components, these components should not to be limited by these terms. These terms are only used to distinguish one component from another component. Thus, a first component to be described below may be a second component without departing from the teachings of the inventive concept.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be described with reference to accompanying drawings. First, an electric vehicle transmission system will be described with reference to FIGS. 1 and 2, according to the first embodiment of the inventive concept.

FIG. 1 is a view illustrating the configuration of an electric vehicle transmission system, according to a first embodiment of the inventive concept.

Referring to FIG. 1, according to the first embodiment of the inventive concept, an electric vehicle transmission includes a power source 100 to supply power, an input shaft 102 mounted to receive rotational force from the power source 100, a ring gear carrier 104 connected to the input shaft 102, a ring gear 106 connected to the ring gear carrier 104, a planetary gear 108 engaged with an inner portion of the ring gear 106 to rotate, a planetary gear carrier 112 connected to the planetary gear 108, an output shaft 114 shaft-connected to the planetary gear carrier 112, a sun gear 110 mounted while engaged with the planetary gear 108 to rotate and connected to the output shaft 114 such that the output shaft 114 is rotatable, a first-gear shifting part 200 coupled to the sun gear 110 to restrict the rotation of the sun gear 110 and reduce one-directional rotational force from the power source 100 through the input shaft 102, the ring gear carrier 104, the rotation of which is not restricted, the ring gear 106, the planetary gear 108, and the planetary gear carrier 112, the rotation of which is not restricted, while transmitting the one-directional rotational force to the output shaft 114 such that the output shaft 114 is rotated in one direction, thereby making the first-gear shifting, and a second-gear shifting part 300 to couple the ring gear carrier 104 to the planetary gear carrier 112 such that the input shaft 102, the ring gear carrier 104, the ring gear 106, the planetary gear 108, the planetary gear carrier 112, and the output shaft 114 become one body, so the one-directional rotational force transmitted from the power source 100 to the input shaft 102 is transmitted to the output shaft 114 without being reduced and changed in direction, thereby making the second-gear shifting.

The power source 100 to supply power to the electric vehicle may be an electric motor operated through electricity supplied. However, according to the first embodiment of the inventive concept, the power source 100 may use another power device together with the electric motor. The input shaft 102 is rotated by the operation of the electric motor to rotate the ring gear carrier 104.

The ring gear carrier 104 may be connected to the input shaft 102, which receives the rotational force from the power source 100, directly or through another link member.

The ring gear 106 is connected to the ring gear carrier 104 and rotates through the rotation of the ring gear carrier 104.

The planetary gear 108 is mounted to be engaged the inner portion of the ring gear 106 to rotate.

In this case, a plurality of planetary gears 108 may be toothed with the outer portion of the sun gear 110 while being spaced apart from each other with a setting distance. The planetary gear 108 is engaged with the outer portion of the sun gear 110 to self-rotate while revolving along the outer portion of the sun gear 110. A self-rotating direction and a revolving direction are different from each other.

The planetary gear carrier 112 is connected to the planetary gear 108 to rotate as the planetary gear 108 rotates. In this case, the planetary gear carrier 112 may be connected to the planetary gear 108 directly or through another link member.

The output shaft 114 is connected to the planetary gear carrier 112 and rotates together with the planetary gear carrier 112. The output shaft 114 may be connected to the planetary gear carrier 112 directly or through another link member.

The sun gear 110 is mounted to be engaged with the inner portion of the planetary gear 108 and connected to the output shaft 114 such that the output shaft 114 is rotatable.

In this case, the sun gear 110 may be connected to the output shaft 114 through a rotation member such as a bearing.

The first-gear shifting part 200 is coupled to the sun gear 110 to restrict the rotation of the sun gear 110, and the first-gear shifting is performed in a state in which the rotation of the sun gear 110 is restricted.

In other words, in the state in which the rotation of the sun gear 110 is restricted, the input shaft 102 applied with one-directional rotational force from the power source 100 rotates in the one direction, the ring gear carrier 104, the rotation of which is not restricted, rotates in the one direction, and thus the ring gear 106 connected to the ring gear carrier 104 rotates in the one direction. Accordingly, as the ring gear 106 rotates in the one direction, the planetary gear 108 self-rotates in a direction different from the one direction. This self-rotation makes the one-directional rotational speed of the ring gear 106 reduced, and the planetary gear 108 revolves in the one direction along the sun gear 110, the rotation of which is restricted, at the reduced one-directional rotational speed. The reduced one-directional rotational force is transmitted to the planetary gear carrier 112, the rotation of which is not restricted, and the output shaft 114 connected to the planetary gear carrier 112 rotates in the one direction reduced in rotational speed, thereby making the first-gear shifting.

The first-gear shifting part 200 enabling the first-gear shifting includes a sleeve guide 202 fixedly connected to the sun gear 110, a fixed sleeve guide 204 mounted to be spaced apart from the sleeve guide 202, a first-gear shifting sleeve 206 that slides on the fixed sleeve guide 204 to be coupled to or decoupled from the sleeve guide 202, a first-gear shifting fork 208 rotatably connected to the first-gear shifting sleeve 206, a first-gear shifting fork driving shaft 210 connected to the first-gear shifting fork 208 such that the first-gear shifting fork 208 is movable linearly, and a first-gear shifting actuator motor 212 to rotate the first-gear shifting fork 208.

The first-gear shifting fork driving shaft 210 and the first-gear shifting fork 208 rotating by receiving the rotational force from the first-gear shifting actuator motor 212 may be fastened by a ball screw manner or a trapezoidal screw coupling manner. Accordingly, the first-gear shifting fork 208 may move linearly along the first-gear shifting fork driving shaft 210 which is rotating. The ball screw manner may be used in a transmission system of an electric vehicle that requires precise shifting, and the trapezoidal screw coupling manner may be used in a transmission system of an electric vehicle that requires high-power shifting.

The first-gear shifting sleeve 206 is slidably mounted at the outer portion of the sleeve guide 202 and the fixed sleeve guide 204, respectively.

The first-gear shifting sleeve 206 has teeth formed on the inner portion thereof, and the sleeve guide 202 and the fixed sleeve guide 204 each have teeth formed on the outer portion thereof. Accordingly, the first-gear shifting sleeve 206 may couple or decouple the sleeve guide 202 and the fixed sleeve guide 204 to or from each other, as the first-gear shifting fork 208 linearly moves along the first-gear shifting fork driving shaft 210. When the sleeve guide 202 and the fixed sleeve guide 204 are coupled to each other, the rotation of the sun gear 110 is restricted. When the sleeve guide 202 and the fixed sleeve guide 204 are decoupled from each other, the sun gear 110 is rotatable.

In this case, the sleeve guide 202 and the fixed sleeve guide 204 are coupled to each other through the first-gear shifting sleeve 206, and the coupling manner may include a dog-type manner or a synchro-type manner.

Meanwhile, the second-gear shifting part 300 couples the ring gear carrier 104 to the planetary gear carrier 112 such that the input shaft 102, the ring gear carrier 104, the ring gear 106, the planetary gear 108, the planetary gear carrier 112, and the output shaft 114 become one body, to transmit, to the output shaft 114, the one-directional rotational force transmitted to the input shaft 102 from the power source 100 without being reduced or changed in the rotational direction, thereby performing the second-gear shifting.

In this case, when the input shaft 102, the ring gear carrier 104, the ring gear 106, the planetary gear 108, the planetary gear carrier 112, and the output shaft 114 become one body, the one-directional rotational force transmitted to the input shaft 102 from the power source 100 is transmitted to the planetary gear 108 without being reduced. As the planetary gear 108 is engaged with the sun gear 110, the rotation of which is not restricted, to rotate in one direction, and the one directional rotational force of the planetary gear 108 is transmitted to the output shaft 114 without being changed in direction, thereby performing the second-gear shifting.

The second-gear shifting part 300 includes a second-gear shifting hub 302 fixed to the planetary gear carrier 112, a second-gear shifting sleeve 304 sliding on the second-gear shifting hub 302 to be coupled to or decoupled from the ring gear carrier 104, a second-gear shifting fork 306 rotatably coupled to the second-gear shifting sleeve 304, a second-gear shifting fork driving shaft 308 connected to the second-gear shifting fork 306 to be linearly movable, and a second-gear shifting actuator motor 310 to rotate the second-gear shifting fork driving shaft 308.

The second-gear shifting fork driving shaft 308 and the second-gear shifting fork 306 rotating by receiving the rotational force from the second-gear shifting actuator motor 310 may be fastened by a ball screw manner or a trapezoidal screw coupling manner. Accordingly, the second-gear shifting fork 306 may move linearly along the second-gear shifting fork driving shaft 308 which is rotating.

The second-gear shifting hub 302 is mounted at the rear portion spaced apart from the ring gear carrier 104 and is fixedly connected to the planetary gear carrier 112.

The second-gear shifting sleeve 304 is mounted to slide on the outer portion of the second-gear shifting hub 302.

The second-gear shifting sleeve 304 has teeth formed at the inner portion thereof, and the second-gear shifting hub 302 and the ring gear carrier 104 have teeth formed on the outer portion thereof, respectively Accordingly, the second-gear shifting sleeve 304 may couple or decouple the second-gear shifting hub and the ring gear carrier 104 to or from each other as the second-gear shifting fork 306 linearly moves along the second-gear shifting fork driving shaft 308.

In this case, the second-gear shifting hub 302 and the ring gear carrier 104 are coupled through the second-gear shifting sleeve 304, and the coupling manner may include a dog-type manner or a synchro-type manner.

According to the first embodiment of the inventive concept, the electric vehicle transmission system may further include a shifting control unit 500.

In the first-gear shifting, the shifting control unit 500 controls the first-gear shifting part 200 to couple the sun gear 110 to the first-gear shifting part 200 such that the rotation of the sun gear 110 is restricted, and controls the second-gear shifting part 300 not to couple the ring gear carrier 104 to the planetary gear carrier 112.

In the second-gear shifting, the shifting control unit 500 controls the second-gear shifting part 300 to couple the ring gear carrier 104 to the planetary gear carrier 112 such that the input shaft 102, the ring gear carrier 104, the ring gear 106, the planetary gear 108, the planetary gear carrier 112, and the output shaft 114 become one body, and controls the first-gear shifting part 200 not to couple the sun gear 110 to the first-gear shifting part 200 such that the rotation of the sun gear 110 is not restricted.

Meanwhile, according to an embodiment, in reverse-gear shifting, the shifting control unit 500 controls the first-gear shifting part 200 to be coupled to the sun gear 110, such that the rotation of the sun gear 110 is restricted, and controls the second-gear shifting part 300 not to the ring gear carrier 104 to the planetary gear carrier 112 while controlling the power source 100, such that different-directional rotational force of the power source 100 is transmitted to the input shaft 102.

According to another embodiment, in the reverse-gear shifting, the shifting control unit 500 controls the second-gear shifting part 300 to couple the ring gear carrier 104 to the planetary gear carrier 112 such that the input shaft 102, the ring gear carrier 104, the ring gear 106, the planetary gear 108, the planetary gear carrier 112, and the output shaft 114 become one body, and controls the first-gear shifting part 200 not to couple the sun gear 110 to the first-gear shifting part 200 while controlling the power source 100 such that the different-directional rotational force of the power source 100 is transmitted to the input shaft 102.

According to the first embodiment of the inventive concept, the electric vehicle transmission system implements the linear movement of the first-gear shifting sleeve 206 and the second-gear shifting sleeve 304 for the first-gear shifting, second-gear shifting, or reverse-gear shifting using two actuator motors of the first-gear shifting actuator motor 212 and the second-gear shifting actuator motor 310.

However, the inventive concept is not limited thereto, and the linear movement of the first-gear shifting sleeve 206 and the second-gear shifting sleeve 304 may be implemented by using one actuator motor instead of the two actuator motors of the first-gear shifting actuator motor 212 and the second-gear shifting actuator motor 310.

In other words, two driving shafts, which are the first-gear shifting fork driving shaft 210 and the second-gear shifting fork driving shaft 308, are provided in one actuator motor, and the one actuator motor linearly moves the first-gear shifting fork 208 on the first-gear shifting fork driving shaft 210 and the second-gear shifting fork 306 on the second-gear shifting fork driving shaft 308 when performing the first-gear shifting, the second-gear shifting, or reverse-gear shifting under the control of the shifting control unit 500.

Accordingly, the linear movement of the first-gear shifting sleeve 206 connected to the first-gear shifting fork 208 is performed, the linear movement of the second-gear shifting sleeve 304 connected to the second-gear shifting fork 306, thereby performing the first-gear shifting, the second-gear shifting, or the reverse-gear shifting.

Hereinafter, the first-gear shifting, the second-gear shifting, and the reverse-gear shifting of the electric vehicle transmission system will be described according to the first embodiment of the inventive concept.

First, the first-gear shifting will be described with reference to FIG. 1.

Referring to FIG. 1, in the first-gear shifting, the shifting control unit 500 controls the first-gear shifting part 200 to be coupled to the sun gear 110 such that the rotation of the sun gear 110 is restricted, and controls the second-gear shifting part 300 to decouple the ring gear carrier 104 from the planetary gear carrier 112, such that the ring gear carrier 104 and the planetary gear carrier 112 are rotatable.

In other words, the first-gear shifting actuator motor 212 rotates the first-gear shifting fork driving shaft 210 under the control of the shifting control unit 500 to linearly move the first-gear shifting fork 208 on the first-gear shifting fork driving shaft 210, and moves the first-gear shifting sleeve 206, which is rotatably coupled to the first-gear shifting fork 208, to the sleeve guide 202 from the fixed sleeve guide 204 such that the fixed sleeve guide 204 is coupled to the sleeve guide 202. Accordingly, the sun gear 110 connected to the sleeve guide 202 is fixed to the fixed sleeve guide 204 to restrict the rotation of the sun gear 110.

In addition, the second-gear shifting actuator motor 310 is prevented from being driven under the control of the shifting control unit 500 to prevent the second-gear shifting fork driving shaft 308 from being rotated, thereby preventing the second-gear shifting fork 306 from linearly moving on the second-gear shifting fork driving shaft 308. Accordingly, the second-gear shifting sleeve 304 rotatably connected to the second-gear shifting fork 306 is prevented from sliding on the second-gear shifting hub 302. The planetary gear carrier 112 connected to the second-gear shifting hub 302 is prevented from being coupled to the ring gear carrier 104. Accordingly, the rotation of the ring gear carrier 104 and the planetary gear carrier 112 is not restricted.

In this state, the shifting control unit 500 controls the power source 100 to rotate in one direction. Accordingly, the one-directional rotational force from the power source 100 is transmitted to the input shaft 102 in the state that the rotation of the sun gear 110 is restricted, such that the input shaft 102 rotates in one direction 'A'.

Accordingly, the ring gear carrier 104, the rotation of which is not restricted, rotates in the one direction 'A', so the ring gear 106 connected to the ring gear carrier 104 rotates in the one direction 'A'. As the ring gear 106 rotates in the one direction 'A', the planetary gear 108 rotates in a direction 'B' different from the one direction 'A'. This self-rotation makes the one-directional rotational speed of the ring gear 106 reduced, and the planetary gear 108 revolves in the one direction 'A' along the sun gear 110, the rotation of which is restricted, at the reduced one-directional rotational speed. The reduced rotational force in the one direction 'A' is transmitted to the planetary gear carrier 112, the rotation of which is not restricted, and the output shaft 114 connected to the planetary gear carrier 112 rotates in one direction 'A' reduced in rotational speed, thereby making the first-gear shifting.

Next, the second-gear shifting will be described below with reference to FIG. 2.

In the second-gear shifting, the shifting control unit 500 controls the second-gear shifting part 300 to couple the ring gear carrier 104 to the planetary gear carrier 112 such that the input shaft 102, the ring gear carrier 104, the ring gear 106, the planetary gear 108, the planetary gear carrier 112, and the output shaft 114 become one body, and controls the first-gear shifting part 200 not to be coupled to the sun gear 110 such that the rotation of the sun gear 110 is not restricted.

In other words, the second-gear shifting actuator motor 310 rotates the second-gear shifting fork driving shaft 308 under the control of the shifting control unit 500 to linearly move the second-gear shifting fork 306 on the second-gear shifting fork driving shaft 308, and moves the second-gear shifting sleeve 304 rotatably connected to the second-gear shifting fork 306 from the second-gear shifting hub 302 to the ring gear carrier 104, thereby coupling the ring gear carrier 104 to the planetary gear carrier 112 fixed to the second-gear shifting hub 302. Accordingly, the input shaft 102, the ring gear carrier 104, the ring gear 106, the planetary gear 108, the planetary gear carrier 112, and the output shaft 114 become one body.

In addition, the first-gear shifting actuator motor 212 is prevented from being driven under the control of the shifting control unit 500 to prevent the first-gear shifting fork driving shaft 210 from being rotated, thereby preventing the first-gear shifting fork 208 from linearly moving on the first-gear shifting fork driving shaft 210. Therefore, the first-gear shifting sleeve 206 rotatably connected to the second-gear shifting fork is prevented from sliding on the fixed sleeve guide 204. Accordingly, the fixed sleeve guide 204 is not coupled to the sun gear 110 connected to the sleeve guide 202. Accordingly, the rotation of the sun gear 110 is not restricted.

In this state, the shifting control unit 500 controls the power source 100 to rotate in one direction 'A'.

Since the input shaft 102, the ring gear carrier 104, the ring gear 106, the planetary gear 108, the planetary gear carrier 112, and the output shaft 114 become one body, the one-directional rotational force transmitted to the input shaft 102 from the power source 100 is transmitted to the output shaft 114 without being reduced and changed in the rotational direction, thereby making the second-gear shifting.

In other words, when the input shaft 102, the ring gear carrier 104, the ring gear 106, the planetary gear 108, the planetary gear carrier 112, and the output shaft 114 become one body, the rotational force in the one direction 'A' transmitted to the input shaft 102 from the power source 100 is transmitted to the planetary gear 108 without being reduced. As the planetary gear 108 is engaged with the sun gear 110, the rotation of which is not restricted, to rotate in one direction 'A', and the one directional rotational force of the planetary gear 108 is transmitted to the output shaft 114 without being changed in direction through the planetary gear carrier 112, thereby performing the second-gear shifting.

Finally, the reverse-gear shifting will be described below.

In the reverse-gear shifting, the rotational force of the power source 100 is transmitted to the input shaft 102 in a direction 'B' different from the one direction 'A' which is the direction of the rotational force of the power source 100 in the first-gear shifting or the second-gear shifting for moving forward the electric vehicle.

The reverse-gear shifting may be performed through the first-gear shifting or the second-gear shifting.

First, the reverse-gear shifting through the first-gear shifting will be described below.

In the reverse-gear shifting through the first-gear shifting, the shifting control unit 500 controls the first-gear shifting part 200 to be coupled to the sun gear 110 such that the rotation of the sun gear 110 is restricted, and controls the second-gear shifting part 300 to decouple the ring gear carrier 104 from the planetary gear carrier 112, such that the ring gear carrier 104 and the planetary gear carrier 112 are rotatable.

In other words, the first-gear shifting actuator motor 212 rotates the first-gear shifting fork driving shaft 210 under the control of the shifting control unit 500 to linearly move the first-gear shifting fork 208 on the first-gear shifting fork driving shaft 210, and moves the first-gear shifting sleeve 206, which is rotatably connected to the first-gear shifting fork 208, to the sleeve guide 202 from the fixed sleeve guide 204 such that the fixed sleeve guide 204 is coupled to the sleeve guide 202. Accordingly, the sun gear 110 connected to the sleeve guide 202 is fixed to the fixed sleeve guide 204 to restrict the rotation of the sun gear 110.

In addition, the second-gear shifting actuator motor 310 is prevented from being driven under the control of the shifting control unit 500 to prevent the second-gear shifting fork driving shaft 308 from being rotated, thereby preventing the second-gear shifting fork 306 from linearly moving on the second-gear shifting fork driving shaft 308. Therefore, the second-gear shifting sleeve 304 rotatably connected to the second-gear shifting fork 306 is prevented from sliding on the second-gear shifting hub 302. The planetary gear carrier 112 connected to the second-gear shifting hub 302 is prevented from being coupled to the ring gear carrier 104. Accordingly, the rotation of the ring gear carrier 104 and the planetary gear carrier 112 is not restricted.

In this state, the shifting control unit 500 controls the power source 100 to rotate in a direction 'B' different from one direction 'A'. Accordingly, the different-directional rotational force of the power source 100 is transmitted to the input shaft 102 in the state that the rotation of the sun gear 110 is restricted, such that the input shaft 102 rotates in the different direction 'B'. Accordingly, the ring gear carrier 104, the rotation of which is not restricted, rotates in the different direction 'B', so the ring gear 106 connected to the ring gear carrier 104 rotates in the different direction 'B'. The planetary gear 108 self-rotates in one direction 'A' instead of the different direction 'B' as the ring gear 106 rotates in the different direction 'B'. This self-rotation makes the different-directional rotational speed of the ring gear 106 reduced, and the planetary gear 108 revolves in the different direction 'B' along the sun gear 110, the rotation of which is restricted, at the reduced different-directional rotational speed. The reduced rotational force in the different direction 'B' is transmitted to the planetary gear carrier 112, the rotation of which is not restricted, and the output shaft 114 connected to the planetary gear carrier 112 rotates in the different direction 'B' reduced in rotational speed, thereby performing the reverse-gear shifting.

Hereinafter, the procedure for the reverse-gear shifting through the second-gear shifting will be described below.

In the reverse-gear shifting through the second-gear shifting, the shifting control unit 500 controls the second-gear shifting part 300 to couple the ring gear carrier 104 to the planetary gear carrier 112 such that the input shaft 102, the ring gear carrier 104, the ring gear 106, the planetary gear 108, the planetary gear carrier 112, and the output shaft 114 become one body, and controls the first-gear shifting part 200 not to couple the sun gear 110 to the first-gear shifting part 200 such that the rotation of the sun gear 110 is not restricted.

In other words, the second-gear shifting actuator motor 310 rotates the second-gear shifting fork driving shaft 308 under the control of the shifting control unit 500 to linearly move the second-gear shifting fork 306 on the second-gear shifting fork driving shaft 308, and moves the second-gear shifting sleeve 304 rotatably connected to the second-gear shifting fork 306 from the second-gear shifting hub 302 to the ring gear carrier 104, thereby coupling the ring gear carrier 104 to the planetary gear carrier 112 fixed to the second-gear shifting hub 302. Accordingly, the input shaft 102, the ring gear carrier 104, the ring gear 106, the planetary gear 108, the planetary gear carrier 112, and the output shaft 114 become one body.

In addition, the first-gear shifting actuator motor 212 is prevented from being driven under the control of the shifting control unit 500 to prevent the first-gear shifting fork driving shaft 210 from being rotated, thereby preventing the first-gear shifting fork 208 from linearly moving on the first-gear shifting fork driving shaft 210. Accordingly, the first-gear shifting sleeve 206 rotatably connected to the first-gear shifting fork is prevented from sliding on the fixed sleeve guide 204. Accordingly, the fixed sleeve guide 204 is not coupled to the sun gear 110 connected to the sleeve guide 202. Accordingly, the rotation of the sun gear 110 is not restricted.

In this state, the shifting control unit 500 controls the power source 100 to rotate in the different direction 'B' instead of the one direction 'A'.

Since the input shaft 102, the ring gear carrier 104, the ring gear 106, the planetary gear 108, the planetary gear carrier 112, and the output shaft 114 become one body, the different directional rotational force transmitted to the input shaft 102 from the power source 100 is transmitted to the output shaft 114 without being reduced or changed in the rotational direction, thereby performing the reverse-gear shifting.

In other words, when the input shaft 102, the ring gear carrier 104, the ring gear 106, the planetary gear 108, the planetary gear carrier 112, and the output shaft 114 become one body, the rotational force in the different direction 'B' transmitted to the input shaft 102 from the power source 100 is transmitted to the planetary gear 108 without being reduced. As the planetary gear 108 is engaged with the sun gear 110, the rotation of which is not restricted, to rotate in the different direction 'B', and the different directional rotational force of the planetary gear 108 is transmitted to the output shaft 114 through the planetary gear carrier 112 without being changed in direction, thereby performing the second-gear shifting.

Figure 2:
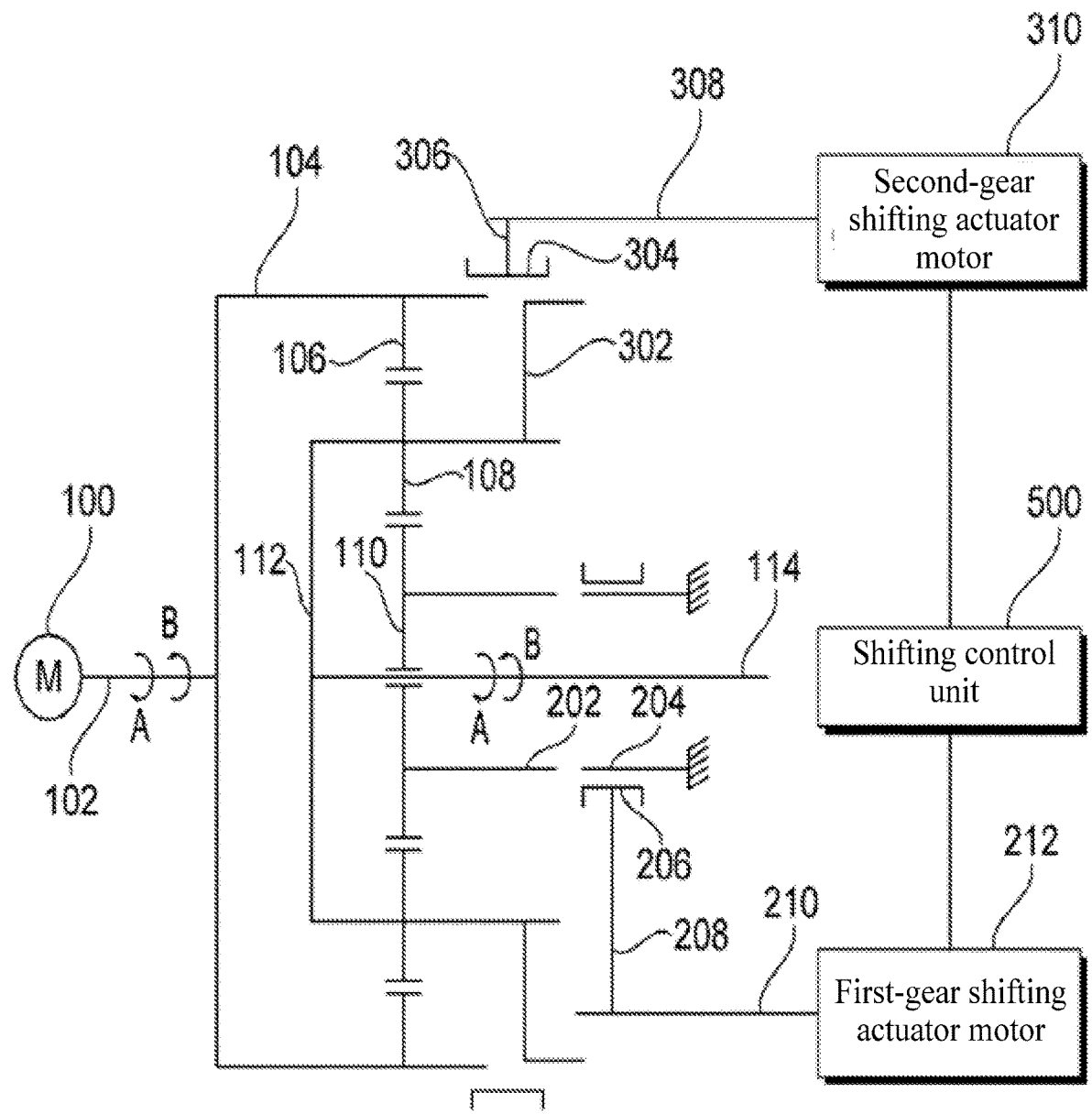
FIG. 2 is a view illustrating that a second-gear shifting state and a reverse-gear shifting state through second-gear shifting of an electric vehicle transmission system, according to the first embodiment of the inventive concept.

The one direction 'A' and the different direction 'B' illustrated in FIGS. 1 and 2 are opposite to each other by way of example, but the inventive concept is not limited thereto. In other words, on the assumption that the one direction 'A' illustrated in FIGS. 1 and 2 is a clockwise direction, the different direction 'B' is a counterclockwise direction. On the assumption that the one direction 'A' is the counterclockwise direction, the different direction 'B' is the clockwise direction.

The above inventive concept has been described while focusing on the first embodiment. Those skilled in the art should understand that various modifications are possible without departing from the technical scope of the inventive concept or without changing the technical spirit or the subject matter of the inventive concept.

Therefore, the first embodiment should be considered in an illustrative aspect instead of a limited aspect. Accordingly, it should be interpreted that the scope of the inventive concept includes various embodiments falling within the disclosure in claims and equivalents thereof without limited to the first embodiment described above.

Hereinafter, an electric vehicle transmission system will be described with reference to FIGS. 3 to 6, according to a second embodiment of the inventive concept.

Figure 3:
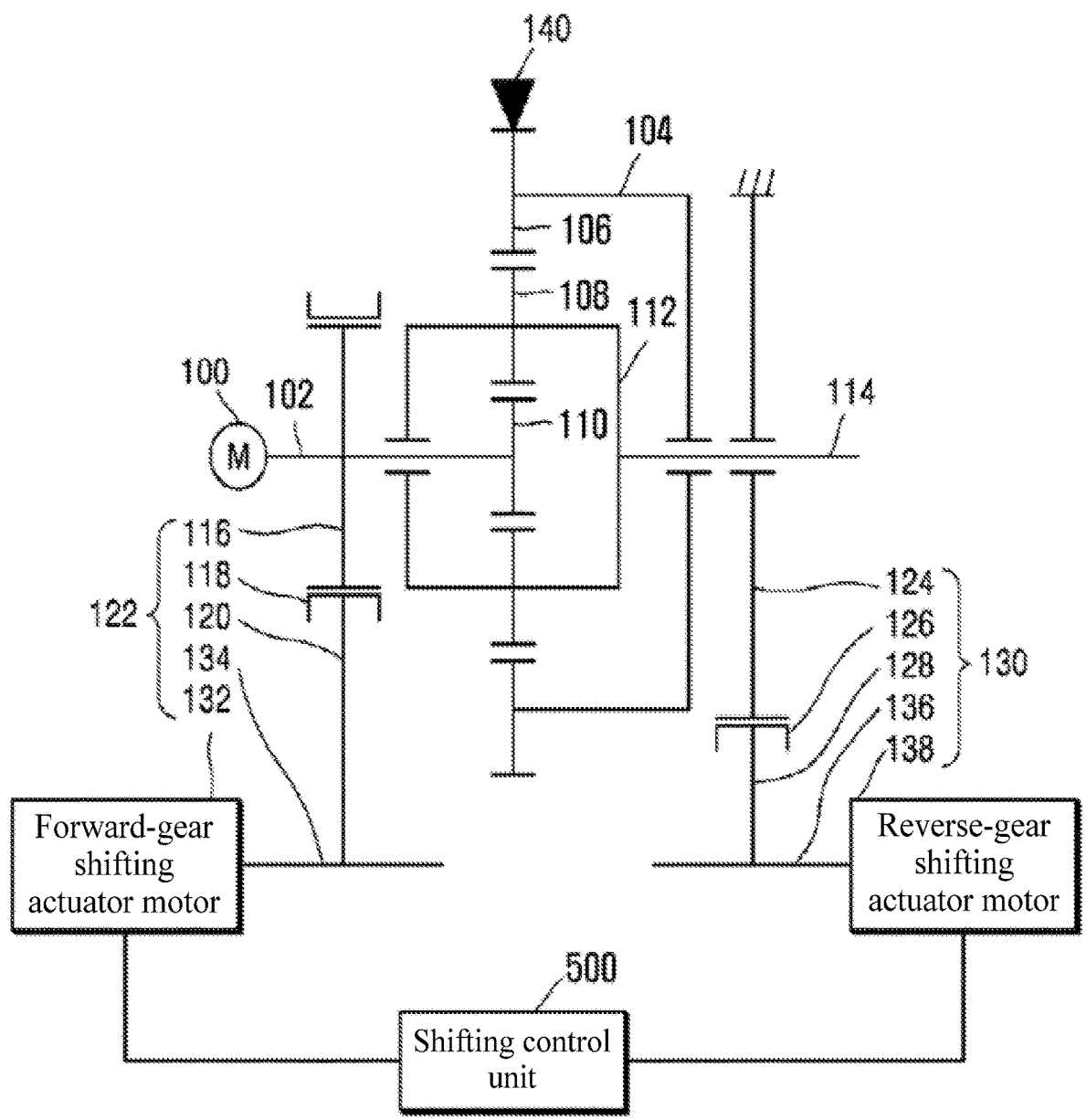
FIG. 3 is a view illustrating the configuration of an electric vehicle transmission system capable of performing reverse control, in which a first-gear shifting state is illustrated, according to a second embodiment of the inventive concept.

FIG. 3 is a view illustrating the configuration of an electric vehicle transmission system capable of performing reverse control, according to the second embodiment of the inventive concept.

Referring to FIG. 3, according to the second embodiment of the inventive concept, the electric vehicle transmission system includes the power source 100 to supply power, the input shaft 102 mounted to receive rotational force from the power source 100, the sun gear 110 shaft-connected to the input shaft 102 to be rotated, the planetary gear 108 mounted to be engaged with the outer portion of the sun gear 110, the planetary gear carrier 112 to support the planetary gear 108 such that the planetary gear 108 is rotatable on the input shaft 102, the output shaft 114 connected to the planetary gear carrier 112, the ring gear 106 mounted at the outer portion of the planetary gear carrier 112 and toothed with the planetary gear 108, the ring gear carrier 104 to support the ring gear 106 such that the ring gear 106 is rotatable on the output shaft 114, a one-way clutch 140 allowing only one-directional rotation of the ring gear 106, a forward-gear shifting part 122 fixedly coupled to the input shaft 102 to rotate together with the sun gear 110 and coupled to or decoupled from the planetary gear carrier 112 to adjust the forward-gear shifting, and a reverse-gear shifting part 130 rotatably coupled to the output shaft 114 and coupled to or decoupled from the ring gear carrier 104 to adjust the reverse-gear shifting.

The one-way clutch 140 acts in an operating state to restrict the rotation of the ring gear 106 by preventing the ring gear 106 from rotating in a direction different from one direction of the ring gear 106, in the state that the forward-gear shifting part 122 is not coupled to the planetary gear carrier 112, and the reverse-gear shifting part 130 is not coupled to the ring gear carrier 104.

The one-way clutch 140 acts in a non-operating state to allow the rotation of the ring gear 106 in one direction, in the state that the forward-gear shifting part 122 is coupled to the planetary gear carrier 112 and the reverse-gear shifting part 130 is not coupled to the ring gear carrier 104.

The one-way clutch 140 acts in a non-operating state to allow the rotation of the ring gear 106 in one direction, in the state that the forward-gear shifting part 122 is not coupled to the planetary gear carrier 112 and the reverse-gear shifting part 130 is coupled to the ring gear carrier 104. However, the rotation of the ring gear 106 is restricted as the reverse-gear shifting part 130 is coupled to the ring gear carrier 104.

The power source 100 to supply power to the electric vehicle may be an electric motor operated through electricity supplied. However, according to the second embodiment of the inventive concept, the power source 100 may use another power device together with the electric motor. The input shaft 102 is rotated through the operation of the electric motor to rotate the sun gear 110.

The sun gear 110 may be connected to the input shaft 102 to receive the rotational force from the power source 100 directly or through another link member.

A plurality of planetary gears 108 may be toothed with the outer portion of the sun gear 110 while being spaced apart from each other with a setting distance. The planetary gear 108 is engaged with the outer portion of the sun gear 110 to self-rotate while moving along the outer portion of the sun gear 110 to revolve about the sun gear 110.

The planetary gear carrier 112 fixed to the planetary gear 108 and rotatably connected to the input shaft 102 rotates as the planetary gear 108 rotates.

The planetary gear carrier 112 is rotatably connected to the input shaft 102 and the rotational center of the planetary gear carrier 112 is connected to the output shaft 114. Accordingly, the output shaft 114 fixedly connected to the planetary gear carrier 112 rotates while the planetary gear carrier 112 rotates. In this case, the planetary gear carrier 112 may be connected to the input shaft 102 through a rotation member such as a bearing.

The ring gear 106 is mounted at the outer portion of the planetary gear carrier 112 and gear teeth are formed along the inner portion of the ring gear 106. The planetary gear 108 is toothed with the inner portion of the ring gear 106. As the sun gear 110 rotates, the planetary gear 108 rotates while moving along the ring gear 106.

The ring gear 106 is connected to the one-way clutch 140 to allow only one-directional rotation of the ring gear 106.

When the forward-gear shifting part 122 is not coupled to the planetary gear carrier 112, and the reverse-gear shifting part 130 is not coupled to the ring gear carrier 104 to make the first-gear shifting, since the one-way clutch 140 acts in an operating state to allow only the one-directional rotation of the ring gear 106, the one-way clutch 140 interrupts the different-directional rotation of the ring gear 106 to fix the ring gear 106.

For example, when the first-gear shifting is made, and the rotational shaft applied with the rotational force of the power source 100 rotates clockwise, even though the one-way clutch 140 acts in the operating state of allowing the counterclockwise rotation of the ring gear 106, the one-way clutch 140 interrupts the ring gear 106 from rotating clockwise to fix the ring gear 106.

As described above, when the one-way clutch 140 acts in the operating state, the one-way clutch 140 illustrated in FIG. 3 is marked with a black triangle.

Meanwhile, when the forward-gear shifting part 122 is coupled to the planetary gear carrier 112, and the reverse-gear shifting part 130 is not coupled to the ring gear carrier 104 to make the second-gear shifting, and when the forward-gear shifting part 122 is not coupled to the planetary gear carrier 112, and the reverse-gear shifting part 130 is coupled to the ring gear carrier 104 to make the reverse-gear shifting, the one-way clutch 140 acts in a non-operating state to allow only the one-directional rotation of the ring gear 106.

Figure 4:
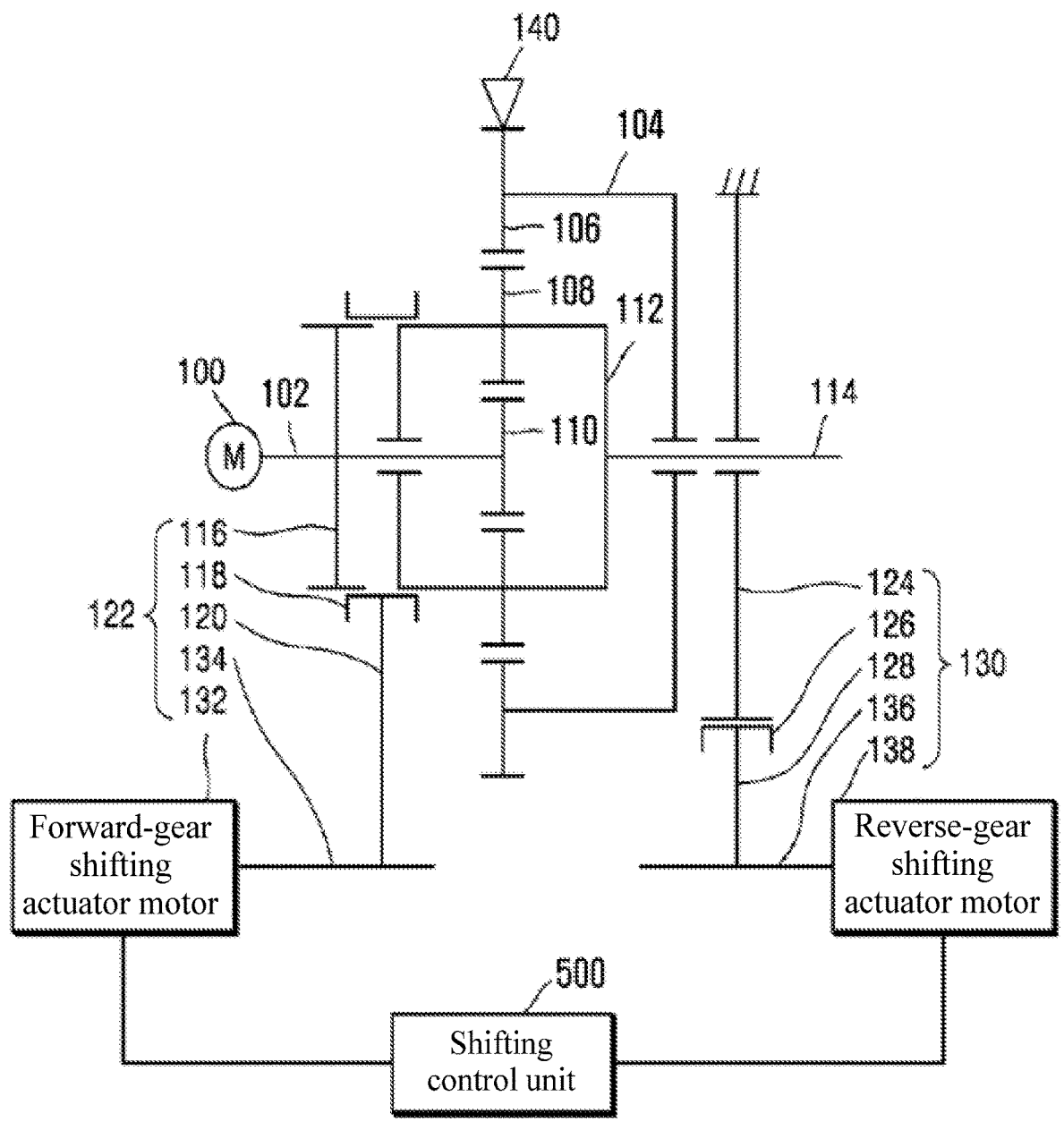
FIG. 4 is a view illustrating a second-gear shifting state of an electric vehicle transmission system, according to the second embodiment of the inventive concept.
Figure 5:
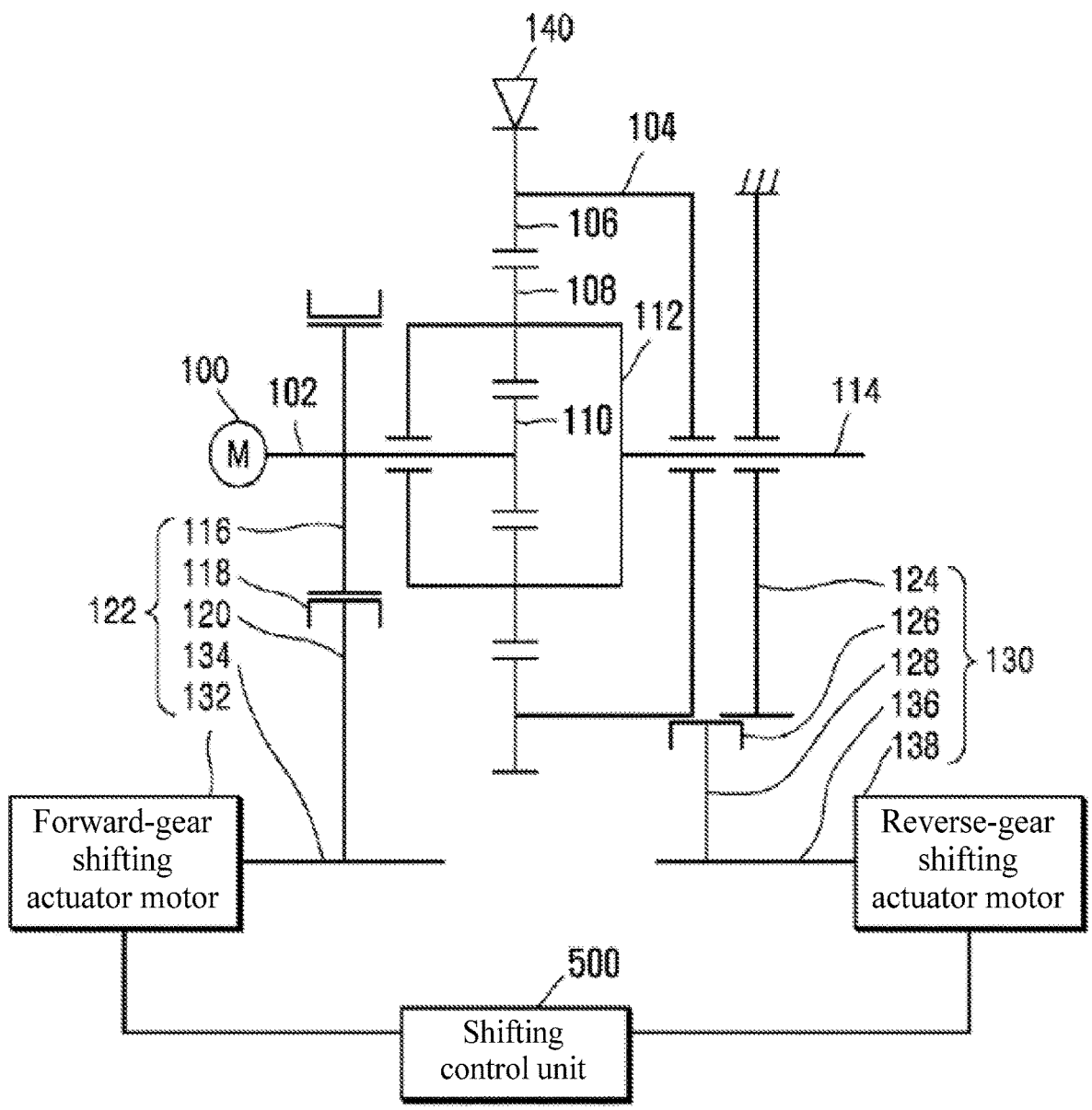
FIG. 5 is a view illustrating a reverse-gear shifting state of an electric vehicle transmission system, according to the second embodiment of the inventive concept.
Figure 6:
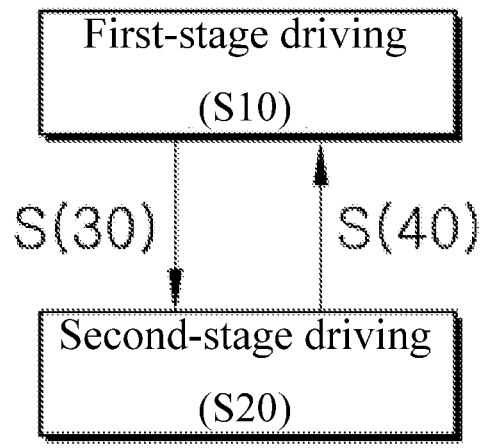
FIG. 6 is a block diagram illustrating a forward-gear shifting operation of an electric vehicle transmission system, according to the second embodiment of the inventive concept.

In this case, when the one-way clutch 140 is in the non-operating state, the one-way clutch 140 illustrated in FIGS. 4 and 5 is marked with a while triangle.

Such a one-way clutch 140 may be a sprag clutch having a plurality of cams which allows one-directional rotation of the ring gear 106 between an inner wheel and an outer wheel. According to a second embodiment of the inventive concept, the one-way clutch 140 may be a sprag clutch having a plurality of cams in the structure of interrupting the ring gear 106 from rotating clockwise between the inner wheel and the outer wheel, that is, the structure of allowing the ring gear 106 to rotate counterclockwise.

The forward-gear shifting part 122 includes a forward-gear shifting hub 116 fixedly connected to the input shaft 102 to receive the rotational force from the power source 100, a forward-gear shifting sleeve 118, which slides on the forward-gear shifting hub 116 to be coupled to or decoupled from the planetary gear carrier 112, a forward-gear shifting fork 120 rotatably connected to the forward-gear shifting sleeve 118, a forward-gear shifting fork driving shaft 134 connected to the forward-gear shifting fork 120 such that the forward-gear shifting fork 120 is linearly movable, and a forward-gear shifting actuator motor 132 to rotate the forward-gear shifting fork driving shaft 134.

The forward-gear shifting fork driving shaft 134 and the forward-gear shifting fork 120 rotating by receiving the rotational force from the forward-gear shifting actuator motor 132 may be fastened by a ball screw manner or a trapezoidal screw coupling manner. Accordingly, the forward-gear shifting fork 120 may move linearly along the forward-gear shifting fork driving shaft 134 which is rotating. The ball screw manner may be used in a transmission system of an electric vehicle that requires precise shifting, and the trapezoidal screw coupling manner may be used in a transmission system of an electric vehicle that requires high-power shifting.

The forward-gear shifting hub 116 is mounted at a front portion spaced away from the planetary gear carrier 112 and fixedly connected to the input shaft 102, and rotates together with the sun gear 110 as the input shaft 102 rotates.

The forward-gear shifting sleeve 118 is mounted on the outer portion of the forward-gear shifting hub 116 such that the forward-gear shifting sleeve 118 is slidable.

The forward-gear shifting sleeve 118 has teeth formed at the inner portion thereof, and the forward-gear shifting hub 116 and the planetary gear carrier 112 have teeth formed on the outer portion thereof, respectively. Accordingly, the forward-gear shifting sleeve 118 may couple or decouple the forward-gear shifting hub 116 and the planetary gear carrier 112 to or from each other as the forward-gear shifting fork 120 linearly moves on the forward-gear shifting fork driving shaft 134.

In this case, the forward-gear shifting hub 116 and the planetary gear carrier 112 are coupled through the forward-gear shifting sleeve 118, and the coupling manner may include a dog-type manner or a synchro-type manner.

The reverse-gear shifting part 130 includes a reverse-gear shifting hub 124 rotatably connected to the output shaft 114, which is fixedly connected to the planetary gear carrier 112 to rotate, a reverse-gear shifting sleeve 126, which slides on the reverse-gear shifting hub 124 to be coupled to or decoupled from the ring gear carrier 104, a reverse-gear shifting fork 128 rotatably connected to the reverse-gear shifting sleeve 126, a reverse-gear shifting fork driving shaft 136 connected to the reverse-gear shifting fork 128 such that the reverse-gear shifting fork 128 is linearly movable, and a reverse-gear shifting actuator motor 138 to rotate the reverse-gear shifting fork driving shaft 136.

The reverse-gear shifting fork driving shaft 136 and the reverse-gear shifting fork 128 rotating by receiving the rotational force from the reverse-gear shifting actuator motor 138 may be fastened by a ball screw manner or a trapezoidal screw coupling manner. Accordingly, the reverse-gear shifting fork 128 may move linearly along the reverse-gear shifting fork driving shaft 136 which is rotating. The ball screw manner may be used in a transmission system of an electric vehicle that requires precise shifting, and the trapezoidal screw coupling manner may be used in a transmission system of an electric vehicle that requires high-power shifting.

The reverse-gear shifting hub 124 is mounted at the rear portion spaced apart from the ring gear carrier 104 and is rotatably connected to the output shaft 114. In this case, the reverse-gear shifting hub 124 may be connected to the output shaft 114 through a rotation member such as a bearing.

The reverse-gear shifting sleeve 126 is mounted on the outer portion of the reverse-gear shifting hub 124 to be slidable.

The reverse-gear shifting sleeve 126 has teeth formed at the inner portion thereof, and the reverse-gear shifting hub 124 and the ring gear carrier 104 have teeth formed on the outer portion thereof, respectively. Accordingly, the reverse-gear shifting sleeve 126 may couple or decouple the reverse-gear shifting hub 124 and the ring gear carrier 104 to or from each other as the reverse-gear shifting fork 128 linearly moves along the reverse-gear shifting fork driving shaft 136.

In this case, the reverse-gear shifting hub 124 and the ring gear carrier 104 are coupled through the reverse-gear shifting sleeve 126, and the coupling manner may include a dog-type manner or a synchro-type manner.

According to the electric vehicle transmission system of the second embodiment of the inventive concept, the linear movement of the forward-gear shifting sleeve 118 and the reverse-gear shifting sleeve 126 is realized for forward-gear shifting or reverse-gear shifting using two actuator motors of the forward-gear shifting actuator motor 132 and the reverse-gear shifting actuator motor 138.

However, the inventive concept is not limited thereto, the linear movement of the forward-gear shifting sleeve 118 and the reverse-gear shifting sleeve 126 may be implemented by using one actuator motor instead of the two actuator motors of the forward-gear shifting actuator motor 132 and the reverse-gear shifting actuator motor 138.

In other words, two driving shafts, which are the forward-gear shifting fork driving shaft 134 and the reverse-gear shifting fork driving shaft 136, are provided in one actuator motor, and the one actuator motor linearly moves the forward-gear shifting fork 120 on the forward-gear shifting fork driving shaft 134 and the reverse-gear shifting fork 128 on the reverse-gear shifting fork driving shaft 136 when performing the first-gear shifting, the second-gear shifting, or reverse-gear shifting under the control of the shifting control unit 500.

Accordingly, the linear movement of the forward-gear shifting sleeve 118 connected to the forward-gear shifting fork 120 is made, and the linear movement of the reverse-gear shifting sleeve 126 connected to the reverse-gear shifting fork 128 is made, thereby making the forward-gear shifting (the first-gear shifting or the second-gear shifting) or the reverse-gear shifting.

According to the second embodiment of the inventive concept, the electric vehicle transmission system may further include the shifting control unit 500.

The shifting control unit 500 controls the forward-gear shifting part 122 not to be coupled to the planetary gear carrier 112 and the reverse-gear shifting part 130 not to be coupled to the ring gear carrier 104, in the first-gear shifting.

In detail, in the first-gear shifting, the shifting control unit 500 performs a control operation to maintain the forward-gear shifting sleeve 118 of the forward-gear shifting part 122 in a neutral state such that the forward-gear shifting sleeve 118 of the forward-gear shifting part 122 is not coupled to the planetary gear carrier 112, and to maintain the reverse-gear shifting sleeve 126 of the reverse-gear shifting part 130 in a neutral state such that the reverse-gear shifting sleeve 126 of the reverse-gear shifting part 130 is not coupled to the ring gear carrier 104.

In this case, in the first-gear shifting, the one-way clutch 140 may be in the operating state (the one-way clutch 140 is marked with a black triangle) as in illustrated in FIG. 3.

In addition, the shifting control unit 500 controls the forward-gear shifting part 122 to be coupled to the planetary gear carrier 112 and the reverse-gear shifting part 130 not to be coupled to the ring gear carrier 104, in the second-gear shifting.

In detail, in the second-gear shifting, the shifting control unit 500 performs a control operation to couple the forward-gear shifting sleeve 118 of the forward-gear shifting part 122 to the planetary gear carrier 112, and to maintain the reverse-gear shifting sleeve 126 of the reverse-gear shifting part 130 in the neutral state such that the reverse-gear shifting sleeve 126 of the reverse-gear shifting part 130 is not coupled to the ring gear carrier 104.

In this case, the one-way clutch 140 may be in the non-operating state (the one-way clutch 140 is marked with a while triangle) as in illustrated in FIG. 4, in the second-gear shifting.

Finally, the shifting control unit 500 controls the forward-gear shifting part 122 not to be coupled to the planetary gear carrier 112 and the reverse-gear shifting part 130 to be coupled to the ring gear carrier 104, in the reverse-gear shifting.

In detail, in the reverse-gear shifting, the shifting control unit 500 performs a control operation to maintain the forward-gear shifting sleeve 118 of the forward-gear shifting part 122 in a neutral state such that the forward-gear shifting sleeve 118 of the forward-gear shifting part 122 is not coupled to the planetary gear carrier 112, and to couple the reverse-gear shifting sleeve of the reverse-gear shifting part 130 to the ring gear carrier 104.

In this case, the one-way clutch 140 may be in the non-operating state (the one-way clutch 140 is marked with a while triangle) as in illustrated in FIG. 5, in the reverse-gear shifting.

Hereinafter, the first-gear shifting, the second-gear shifting, and the reverse-gear shifting of the electric vehicle transmission system will be described according to the second embodiment of the inventive concept.

First, the operation of the first-gear shifting will be described with reference to FIG. 3.

Referring to FIG. 3, the shifting control unit 500 controls the forward-gear shifting part 122 not to be coupled to the planetary gear carrier 112 and the reverse-gear shifting part 130 not to be coupled to the ring gear carrier 104, in the first-gear shifting.

In detail, in the first-gear shifting, the shifting control unit 500 performs a control operation to maintain the forward-gear shifting sleeve 118 of the forward-gear shifting part 122 in a neutral state such that the forward-gear shifting sleeve 118 of the forward-gear shifting part 122 is not coupled to the planetary gear carrier 112, and to maintain the reverse-gear shifting sleeve of the reverse-gear shifting part 130 such that the reverse-gear shifting sleeve of the reverse-gear shifting part 130 is not coupled to the ring gear carrier 104.

In this state, when the input shaft 102 rotates clockwise as the power source 100 operates, the sun gear 110 rotates clockwise together with the input shaft 102. The planetary gear 108 engaged with the sun gear 110 self-rotates counterclockwise. The ring gear 106 engaged with the planetary gear 108 intends to rotate clockwise with respect to the counterclockwise self-rotation of the planetary gear 108. However, the one-way clutch 140 having the structure of interrupting the clockwise rotation of the ring gear 106, that is, the structure of allowing the counterclockwise rotation of the ring gear 106, acts in the operating state to interrupt the clockwise rotation of the ring gear 106, such that the rotation of the ring gear 106 is not performed.

As described above, since the clockwise rotation of the ring gear 106 is restricted by the one-way clutch 140 in the operating state, the planetary gear 108 toothed with the ring gear 106 self-rotates counterclockwise while revolving clockwise along the ring gear 106. Even the planetary gear carrier 112 fixed to the planetary gear 108 rotates in the same direction (clockwise) as the revolving direction of the planetary gear 108.

Since the planetary gear 108 self-rotates counterclockwise while revolving clockwise along the ring gear 106, the revolving speed of the planetary gear 108 is reduced due to the counterclockwise self-rotation of the planetary gear 108 to be lower than the rotational speed of the sun gear 110. The planetary gear carrier 112, which is fixed to the planetary gear 108, rotates clockwise at the same speed as the reduced rotational speed of the planetary gear 108 in the revolving direction, and the rotational speed of the planetary gear carrier 112 becomes lower than the rotational speed of the sun gear 110.

In other words, when the sun gear 110 is driven in the state that the rotation of the ring gear 106 is restricted, the rotational speed of the output shaft 114 fixedly connected to the rotation center of the planetary gear carrier 112 becomes equal to the revolving speed of the planetary gear 108, which is reduced due to the counterclockwise self-rotation of the planetary gear 108, and becomes lower than the rotational speed of the sun gear 110, such that the first-gear shifting of the electric vehicle is made.

Hereinafter, the second-gear shifting will be described.

Referring to FIG. 4, the shifting control unit 500 controls the forward-gear shifting part 122 to be coupled to the planetary gear carrier 112 and the reverse-gear shifting part 130 not to be coupled to the ring gear carrier 104, in the second-gear shifting. In detail, in the second-gear shifting, the shifting control unit 500 performs a control operation to couple the forward-gear shifting sleeve 118 of the forward-gear shifting part 122 to the planetary gear carrier 112, and to maintain the reverse-gear shifting sleeve 126 of the reverse-gear shifting part 130 in the neutral state such that the reverse-gear shifting sleeve 126 of the reverse-gear shifting part 130 is not coupled to the ring gear carrier 104.

The forward-gear shifting sleeve 118 moves to couple the forward-gear shifting hub 116 to the planetary gear carrier 112 under the control of the shifting control unit 500, such that the input shaft 102, the sun gear 110, the forward-gear shifting hub 116, the forward-gear shifting sleeve 118, the planetary gear carrier 112, and the planetary gear 108 become one body.

In this state, when the input shaft 102 rotates clockwise as the power source 100 operates, all the input shaft 102, the sun gear 110, the forward-gear shifting hub 116, the forward-gear shifting sleeve 118, the planetary gear carrier 112, and the planetary gear 108 rotate clockwise.

In other words, the planetary gear 108 and the planetary gear carrier 112, which is engaged with the sun gear 110 rotating clockwise, rotate clockwise at the same speed as the rotational speed of the sun gear 110. In this state, the ring gear 106, which is engaged with the planetary gear 108 rotating clockwise and coupled to the one-way clutch 140 allowing the counterclockwise rotation, rotates counterclockwise. Accordingly, the rotational speed of the output shaft 114, which is fixedly connected to the planetary gear carrier 112 rotating clockwise together with the planetary gear 108, is not reduced, and the second-gear shifting of the electric vehicle is made.

Finally, the reverse-gear shifting will be described below.

Referring to FIG. 5, the shifting control unit 500 controls the forward-gear shifting part 122 not to be coupled to the planetary gear carrier 112 and the reverse-gear shifting part 130 to be coupled to the ring gear carrier 104, in the reverse-gear shifting.

In detail, in the reverse-gear shifting, the shifting control unit 500 performs a control operation to maintain the forward-gear shifting sleeve 118 of the forward-gear shifting part 122 in the neutral state such that the forward-gear shifting sleeve 118 of the forward-gear shifting part 122 is not coupled to the planetary gear carrier 112, and to couple the reverse-gear shifting sleeve 126 of the reverse-gear shifting part 130 to the ring gear carrier 104.

When the input shaft 102 rotates counterclockwise as the power source 100 operates, the sun gear 110 rotates counterclockwise together with the input shaft 102. The planetary gear 108 toothed with the sun gear 110 self-rotates clockwise.

The ring gear 106 engaged with the planetary gear 108 intends to rotate counterclockwise with respect to the clockwise self-rotation of the planetary gear 108. Accordingly, although the one-way clutch 140 acts in a non-operating state of allowing the counterclockwise rotation of the ring gear 106, the ring gear 106 is fixed by the combination of the reverse-gear shifting sleeve and the ring gear carrier 104. Accordingly, the counterclockwise rotation of the ring gear 106 is not made.

In the state that the ring gear 106 is fixed, the planetary gear 108 engaged with the ring gear 106 revolves along the ring gear 106 counterclockwise while self-rotating clockwise. Even the planetary gear carrier 112 fixed to the planetary gear 108 rotates in the same direction (clockwise) as the revolving direction of the planetary gear 108.

Since the planetary gear 108 self-rotates clockwise while revolving counterclockwise along the ring gear 106, the revolving speed of the planetary gear 108 is reduced due to the clockwise self-rotation of the planetary gear 108 to be lower than the rotational speed of the sun gear 110. The planetary gear carrier 112, which is fixed to the planetary gear 108, rotates counterclockwise at the same speed as the reduced revolving speed of the planetary gear 108, and the rotational speed of the planetary gear carrier 112 becomes lower than the rotational speed of the sun gear 110.

In other words, when the sun gear 110 is driven in the state that the rotation of the ring gear 106 is restricted, the rotational speed of the output shaft 114 fixedly connected to the rotation center of the planetary gear carrier 112 becomes equal to the revolving speed of the planetary gear 108, which is reduced due to the clockwise self-rotation of the planetary gear 108, and becomes lower than the rotational speed of the sun gear 110, such that the reverse-gear shifting of the electric vehicle is made.

Hereinafter, a control algorithm of the electric vehicle transmission system will be described according to the second embodiment of the inventive concept.

When turning on an ignition switch of a vehicle to select first-stage start in a high-load vehicle driving mode (S10), a signal of selecting first-stage driving is transmitted to the shifting control unit 500, and the shifting control unit 500 controls the forward-gear shifting actuator motor 132 and the reverse-gear shifting actuator motor 138 to be turned off. Then, the states of the forward-gear shifting actuator motor 132 and the reverse-gear shifting actuator motor 138, which are turned off, are returned to a vehicle controller (not illustrated), and the power source 100 operates in response to an accelerator signal, thereby making the forward first-stage operation as described above.

Accordingly, a driving mechanism is realized in the simple structure that the transmission transmits the rotation and the torque of the power source 100 to a wheel without an additional operation of any device, and drives the vehicle with the optimal efficiency depending on the operation of the power source 100.

Next, when second-stage start is selected for fast start and a high speed-driving mode (S20), a signal for selecting the operation of a second stage of a gear is transmitted to the shifting control unit 500, and the shifting control unit 500 controls the forward-gear shifting actuator motor 132 to be turned on, controls the reverse-gear shifting actuator motor 138 to be turned off, and returns the control states of the forward-gear shifting actuator motor 132 and the reverse-gear shifting actuator motor 138 to the vehicle controller (not illustrated). In this case, the forward-gear shifting hub 116 and the planetary gear carrier 112 are synchronized and connected to each other through the one-way clutch 140, and the power source 100 operates in response to an accelerator signal, thereby making forward second-stage operation.

In addition, the power source 100 operates in response to the accelerator signal, and the electric vehicle transmission system completes the operation of the vehicle driving mode.

Accordingly, the driving mechanism is realized in the simple structure of changing the driving force of the vehicle through the operation of only one one-way clutch 140 and freely selecting a mode depending on the load state of the vehicle.

In order for the vehicle to enter an acceleration mode after reaching a specific speed, when a command is selected to shift from a first stage to a second stage (S30), the shifting control unit 500 determines gear-shifting timing based on information on the speed of the vehicle, a gear ratio, an accelerator position, or a motor state.

The shifting control unit 500 controls the forward-gear shifting actuator motor to be turned on and transmits a coupling signal. In this case, the forward-gear shifting hub 116 and the planetary gear carrier 112 are synchronized and connected to each other through the one-way clutch 140, and the forward-gear shifting actuator motor determines gear-shifting timing through current control based on coupling load.

In addition, the power source 100 operates in response to the signal of the accelerator, and the electric vehicle transmission system operates in a rotation driving mode.

Accordingly, the forward-gear shifting actuator motor 132 realizes the simple gear-shifting mechanism through one control.

In order for the vehicle to enter an uphill mode or a downhill mode, when a command is selected to shift from a second stage to a first stage by way of example (S40), the shifting control unit 500 determines gear-shifting timing based on information on the speed of the vehicle, a gear ratio, an accelerator position, or a motor state.

The shifting control unit 500 controls the forward-gear shifting actuator motor to be turned off, transmits a decoupling signal, decouples the forward-gear shifting hub 116 from the planetary gear carrier 112 through the reverse rotation of the forward-gear shifting actuator motor 132, and determines a decoupling timing based on the decoupling load through the reverse-rotation of the forward-gear shifting actuator motor 132.

In addition, the electric vehicle transmission system completes the gear-shifting without any additional control mechanism.

Accordingly, the forward-gear shifting actuator motor 132 realizes the simple gear-shifting mechanism through one control.

Meanwhile, according to several embodiments, the gear shifting from the first stage to the second stage (S30) and the gear shifting from the second stage to the first stage (S40) may be automatically determined or may be manually determined through the operation of a driver.

With reference to FIGS. 3 to 5, the description has been made in that the restriction in the rotation of the ring gear 106 is performed by the one-way clutch 140. The restriction in rotation of the ring gear 106 may be performed even by a rotation control part including a brake system (not illustrated) or an actuator in addition to the one-way clutch 140. In other words, the brake system or the actuator may allow only one directional-rotation of the ring gear 106 similarly to the one-way clutch 140. In detail, only the one-directional rotation of the ring gear 106 may be allowed under the control of the shifting control unit 500 disclosed in FIGS. 3 to 5.

In other words, in the configuration of FIGS. 3 to 5, the one-way clutch 140 is substituted with the brake system or the actuator to control the rotation of the ring gear 106 in the first-gear shifting, the second-gear shifting, and the reverse-gear shifting.

In the first-gear shifting, the shifting control unit 500 controls the forward-gear shifting part 122 not to be coupled to the planetary gear carrier 112, controls the reverse-gear shifting part 130 not to be coupled to the ring gear carrier 104, and controls the rotation control part. Accordingly, the rotation control part makes contact with the ring gear 106 rotating in the direction different from the one direction of the ring gear 106 to interrupt the ring gear 106 from rotating in the different direction, thereby restricting the rotation of the ring gear 106.

In the second-gear shifting, the shifting control unit 500 controls the forward-gear shifting part 122 to be coupled to the planetary gear carrier 112, controls the reverse-gear shifting part 130 not to be coupled to the ring gear carrier 104, and controls the rotation control part not to make contact with the ring gear 106, thereby allowing the rotation of the ring gear 106 in one direction.

In the reverse-gear shifting, the shifting control unit 500 controls the forward-gear shifting part 122 not to be coupled to the planetary gear carrier 112, controls the reverse-gear shifting part 130 to be coupled to the ring gear carrier 104, and controls the rotation control part not to make contact with the ring gear 106, thereby allowing the rotation of the ring gear 106 in one direction. However, in the reverse-gear shifting, although the one-directional rotation of the ring gear 106 is allowed, the rotation of the ring gear 106 may be restricted through the combination of the reverse-gear shifting part 130 and the ring gear carrier 104.

In FIGS. 3 to 5, the same components are provided except that the one-way clutch 140 is substituted with a rotation control part, and the description of the operation of the components will be omitted below.

The above inventive concept has been described while focusing on the second embodiment. Those skilled in the art should understand that various modifications are possible without departing from the technical scope of the inventive concept or without changing the technical spirit or the subject matter of the inventive concept. Therefore, the second embodiment is provided for the illustrative purpose, and the inventive concept is not limited thereto. Accordingly, it should be interpreted that the scope of the inventive concept includes various embodiments falling within the disclosure in claims and equivalents thereof without limited to the second embodiment described above.

Hereinafter, an electric vehicle transmission system will be described with reference to FIG. 7, according to a third embodiment of the inventive concept.

The manner of transmitting the driving force of the electric vehicle is divided into a transverse type manner and a longitudinal type manner. According to the transverse type manner, the electric vehicle has a structure in which the input shaft 102 to receive power from a driving source (motor) is provided in parallel to the output shaft 114 connected to the input shaft 102 to receive the power from the driving source.

According to the first embodiment and the second embodiment of the inventive concept, the electric vehicle transmission system may employ the transverse type manner. However, according to several embodiments, the electric vehicle transmission system may employ the longitudinal type manner. The third embodiment of the inventive concept is an example in which the electric vehicle transmission systems of the first embodiment and the second embodiment employ the longitudinal type manner. According to various embodiments, the electric vehicle transmission systems of the first embodiment and the second embodiment may employ the longitudinal type manner.

Meanwhile, according to the third embodiment of the inventive concept, the electric vehicle transmission system may further include a transmission 10 mounted between the power source 100 and the input shaft 102 to change the rotational speed of the power source 100. In this case, any one of the electric vehicle transmission systems according to the first embodiment and the second embodiment as the transmission 10 may be employed, thereby converting the transverse-type electric vehicle transmission systems of the first embodiment and the second embodiment into longitudinal-type electric vehicle transmission systems. According to the third embodiment of the inventive concept, the gear-shifting and reversing of the electric vehicle transmission system is possible through the first-gear shifting, the second-gear shifting, or the reverse-gear shifting.

According to the third embodiment of the inventive concept, the electric vehicle transmission system includes the input shaft 102 mounted to receive rotational force from the power source 100, output shafts 114a and 114b disposed perpendicularly to the input shaft 102 and connected to a differential device 70, a driving gear 50 mounted to be freely rotatable about the input shaft 102, and a driven gear 52 toothed with the driving gear 50, and fixedly mounted on the differential device 70 to rotate driving wheels 80 and 82 connected to the output shafts 114a and 114b by rotating the differential device 70.

In this case, the driven gear 52 may be a bevel gear, a spiral gear, or a hypoid gear.

Figure 7:
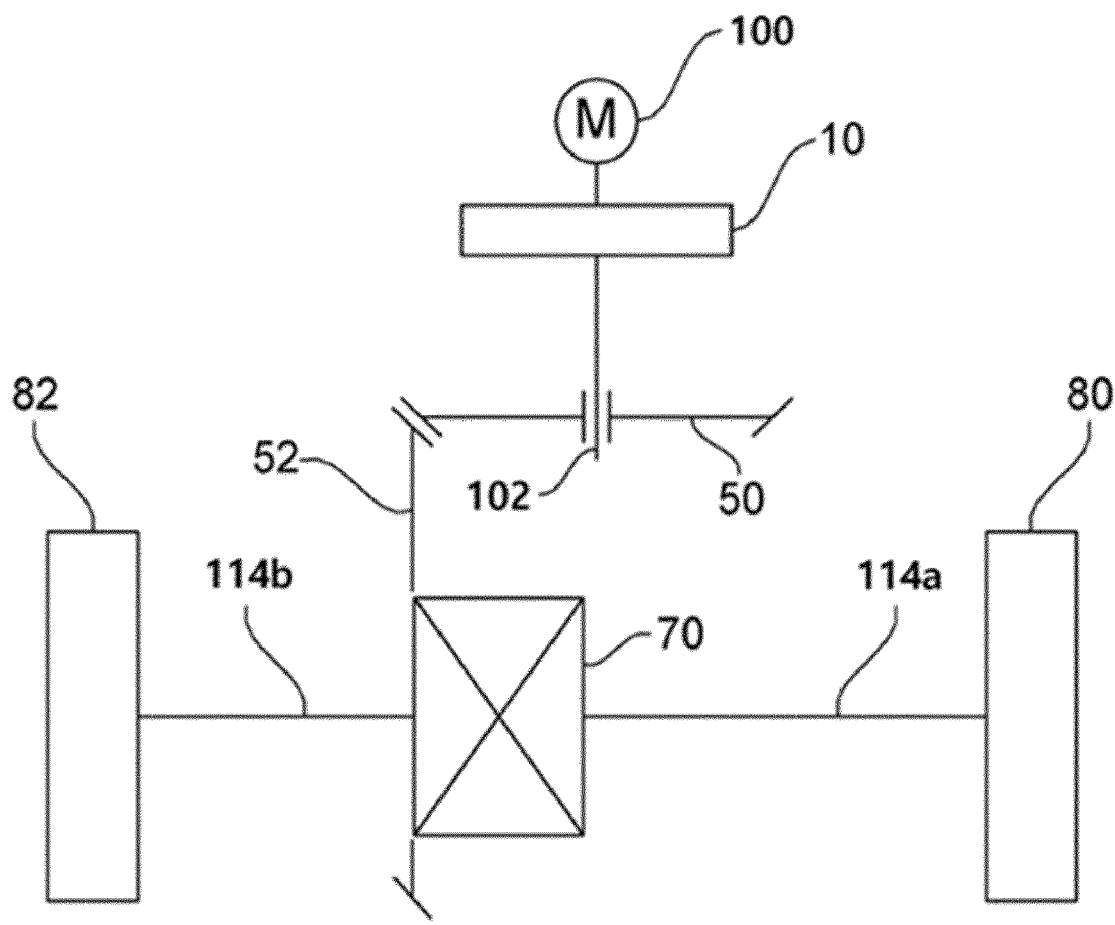
FIG. 7 is a view illustrating an electric vehicle transmission system, according to a third embodiment of the inventive concept.

Referring to FIG. 7, according to the third embodiment of the inventive concept, the electric vehicle transmission system includes the input shaft 102 connected to an electric motor 'M' which is the power source 100, and the output shafts 114a and 114b disposed perpendicularly to the input shaft 102, connected to the differential device 70 to output the power from the electric motor 'M' to the driving wheels 80 and 82 through gear shifting.

In other words, according to the third embodiment of the inventive concept, the electric vehicle transmission system has the structure of rotating the driving wheels 80 and 82 by transmitting the power of the power source 100 input through the input shaft 102 to the output shafts 114a and 114b disposed perpendicularly to the input shaft 102 through the gear-shifting procedure.

In other words, according to the third embodiment of the inventive concept, the electric vehicle transmission system may employ the longitudinal type manner for transmitting driving force and may be used as a power transmission system of an electric vehicle in a front motor front drive (FF; front-wheel drive) or front motor rear drive (FR; rear-wheel drive) type. In addition, the electric vehicle transmission system according to the third embodiment of the inventive concept may be used as a power transmission system of a four wheel drive-type electric vehicle.

Accordingly, the electric vehicle transmission system according to the third embodiment of the inventive concept may be used for a heavy vehicle requiring a large amount of power and a large-size vehicle such as a bus or a truck.

Therefore, since the electric vehicle transmission system of the third embodiment of the inventive concept has a longitudinal-type driving force transmitting manner, the electric vehicle transmission system may perform a function of a power transmission system appropriate to a heavy vehicle requiring a large amount of power, a large-size vehicle, such as a truck or a bus, and a sports vehicle requiring a higher speed, vehicle center balance, and higher rotational inertia.

Further, according to the third embodiment of the inventive concept, the electric vehicle transmission system may further include a parking brake device to prevent collision resulting from sliding in advance, while improving the driver's convenience when stopping or starting.

The parking brake device may be realized as an electric brake or a mechanical parking brake that restricts the rotation of the input shaft 102 or releases the restriction of the rotation of the input shaft 102.

The electric brake may be mounted on the input shaft 102 between the power source 100 and the transmission 10.

The mechanical parking brake may be mounted on an opposite end of the input shaft 102 to one end of the input shaft 102 on which the power source 100 is mounted.

According to the first embodiment of the inventive concept, the electric vehicle transmission system may realize forward-gear shifting and reverse-gear shifting by adopting the reducer in the planetary gear type, thereby increasing the fuel efficiency of the electric vehicle while reducing the production costs of the electric vehicle.

According to the second embodiment of the inventive concept, the electric vehicle transmission system having the reverse control function may realize forward-gear shifting and reverse-gear shifting by adopting the reducer in the planetary gear type, thereby increasing the fuel efficiency of the electric vehicle while reducing the production costs of the electric vehicle.

According to the third embodiment of the inventive concept, the electric vehicle transmission system in the longitudinal type may employ a longitudinal type manner for transmitting driving force and may be used as a power transmission system of an electric vehicle in a front motor front drive (FF; front-wheel drive) type, a front motor rear drive (FR; rear-wheel drive) type, or a four wheel drive type.

The effects of the inventive concept are not limited to the above, but other effects, which are not mentioned, will be apparently understood to those skilled in the art.

The above inventive concept has been described while focusing on the third embodiment. Those skilled in the art should understand that various modifications are possible without departing from the technical scope of the inventive concept or without changing the technical sprite or the subject matter of the inventive concept. Therefore, the third embodiments should be considered in an illustrative aspect instead of a limited aspect. Accordingly, it should be interpreted that the scope of the inventive concept includes various embodiments falling within the disclosure in claims and equivalents thereof without limited to the second embodiment described above.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A transmission system for an electric vehicle, the transmission system comprising:
    a power source configured to provide power;
    an input shaft mounted to receive rotational force from the power source;
    a ring gear carrier connected to the input shaft to rotate as the input shaft rotates;
    a ring gear connected to the ring gear carrier to rotate as the ring gear carrier rotates;
    a planetary gear mounted to be engaged with an inner portion of the ring gear and to rotate;
    a planetary gear carrier connected to the planetary gear to rotate as the planetary gear rotates;
    an output shaft connected to the planetary gear carrier to rotate together with the planetary gear carrier;
    a sun gear mounted to be engaged with an inner portion of the planetary gear to rotate and connected to the output shaft such that the output shaft is rotatable; and
    a first-gear shifting part coupled to the sun gear to stop rotation of the sun gear to make first-gear shifting,
    wherein the first-gear shifting part includes:
    a sleeve guide fixedly connected to the sun gear;
    a fixed sleeve guide mounted to be spaced apart from the sleeve guide;
    a first-gear shifting sleeve configured to slide on the fixed sleeve guide to be coupled to or decoupled from the sleeve guide;
    a first-gear shifting fork rotatably connected to the first-gear shifting sleeve;
    a first-gear shifting fork driving shaft connected to the first-gear shifting fork such that the first-gear shifting fork linearly moves; and
    a first-gear shifting actuator motor configured to rotate the first-gear shifting fork driving shaft.

2. The transmission system of claim 1, wherein the first-gear shifting part is coupled to the sun gear to restrict the rotation of the sun gear, to rotate the input shaft, which is applied with one-directional rotational force from the power source, in one direction, to allow the ring gear carrier, rotation of which is not restricted, to rotate in the one direction, to rotate the ring gear in the one direction, to allow the planetary gear to self-rotate in a direction different from the one direction while revolving along the sun gear, the rotation of which is restricted, at a speed reduced in the one direction, as the ring gear rotates in the one direction, and to rotate the output shaft at a speed reduced in the one direction as rotational force reduced in the one direction is transmitted to the planetary gear, the rotation of which is not restricted, such that the first-gear shifting is made.

3. The transmission system of claim 1, further comprising:
    a second-gear shifting part configured to engage the ring gear carrier with the planetary gear carrier, and to allow the input shaft, the ring gear carrier, the ring gear, the planetary gear, the planetary gear carrier, and the output shaft to become one body such that second-gear shifting is made.

4. The transmission system of claim 3, wherein the second-gear shifting part couples the ring gear carrier to the planetary gear carrier, to allow the input shaft, the ring gear carrier, the ring gear, the planetary gear, the planetary gear carrier, and the output shaft to become one body, to transmit one-directional rotational force, which is transmitted to the input shaft from the power source and is not reduced, to the planetary gear such that the planetary gear is engaged with the sun gear, the rotation of which is not restricted, to rotate in the one direction, and to transmit one-directional rotational force from the planetary gear to the output shaft through the planetary gear carrier such that the second-gear shifting is made.

5. The transmission system of claim 3, further comprising:
    a shifting control unit configured to selectively control the first-gear shifting part and the second-gear shifting part.

6. The transmission system of claim 5, wherein the shifting control unit is configured to:
    control the first-gear shifting part to be coupled to the sun gear to restrict the rotation of the sun gear while controlling the second-gear shifting part to decouple the ring gear carrier from the planetary gear carrier, in the first-gear shifting; and
    control the second-gear shifting part to couple the ring gear carrier with the planetary gear carrier such that the input shaft, the ring gear carrier, the ring gear, the planetary gear, the planetary gear carrier, and the output shaft to become one body, and controls the first-gear shifting part to decouple the sun gear from the first-gear shifting part, in the second-gear shifting.

7. The transmission system of claim 5, wherein the shifting control unit is configured to:
    control the first-gear shifting part to couple the first-gear shifting part to the sun gear to restrict the rotation of the sun gear and control the second-gear shifting part to decouple the ring gear carrier from the planetary gear carrier while controlling the power source such that different-directional rotational force from the power source is transmitted to the input shaft, in reverse-gear shifting.

8. The transmission system of claim 5, wherein the shifting control unit is configured to:
  control the second-gear shifting part to couple the ring gear carrier to the planetary gear carrier such that the input shaft, the ring gear carrier, the ring gear, the planetary gear, the planetary gear carrier, and the output shaft become one body; and
  control the first-gear shifting part to decouple the sun gear from the first-gear shifting part while controlling the power source such that different-directional rotational force is transmitted from the power source to the input shaft, in reverse-gear shifting.

9. A transmission system for an electric vehicle, the transmission system comprising:
  a power source configured to provide power;
  an input shaft mounted to receive rotational force from the power source;
  a ring gear carrier connected to the input shaft to rotate as the input shaft rotates;
  a ring gear connected to the ring gear carrier to rotate as the ring gear carrier rotates;
  a planetary gear mounted to be engaged with an inner portion of the ring gear and to rotate;
  a planetary gear carrier connected to the planetary gear to rotate as the planetary gear rotates;
  an output shaft connected to the planetary gear carrier to rotate together with the planetary gear carrier;
  a sun gear mounted to be engaged with an inner portion of the planetary gear to rotate and connected to the output shaft such that the output shaft is rotatable;
  a first-gear shifting part coupled to the sun gear to stop rotation of the sun gear to make first-gear shifting;
  a second-gear shifting part configured to engage the ring gear carrier with the planetary gear carrier, and to allow the input shaft, the ring gear carrier, the ring gear, the planetary gear, the planetary gear carrier, and the output shaft to become one body such that second-gear shifting is made,
  wherein the second-gear shifting part includes:
    a second-gear shifting hub fixed to the planetary gear carrier;
    a second-gear shifting sleeve configured to slide on the second-gear shifting hub to be coupled to or decoupled from the ring gear carrier;
    a second-gear shifting fork rotatably connected to the second-gear shifting sleeve;
    a second-gear shifting fork driving shaft connected to the second-gear shifting fork such that the second-gear shifting fork is linearly movable; and
    a second-gear shifting actuator motor configured to rotate the second-gear shifting fork driving shaft.

10. A transmission system for an electric vehicle, the transmission system comprising:
  a power source configured to provide power;
  an input shaft mounted to receive rotational force from the power source;
  a sun gear shaft-connected to the input shaft to rotate;
  a planetary gear mounted to be engaged with an outer portion of the sun gear;
  a planetary gear carrier configured to support the planetary gear such that the planetary gear is rotatable on the input shaft;
  an output shaft connected to the planetary gear carrier;
  a ring gear mounted on an outer portion of the planetary gear carrier and toothed to the planetary gear;
  a ring gear carrier configured to support the ring gear such that the ring gear is rotatable on the output shaft;
  a rotation control part configured to allow the ring gear to rotate only in one direction;
  a forward-gear shifting part fixedly coupled to the input shaft to rotate together with the sun gear and coupled to or decoupled from the planetary gear carrier to adjust forward-gear shifting;
  a reverse-gear shifting part rotatably coupled to the output shaft and coupled to or decoupled from the ring gear carrier to adjust reverse-gear shifting; and
  a shifting control unit configured to control the forward-gear shifting part not to be coupled to the planetary gear carrier and to control the reverse-gear shifting part not to be coupled to the ring gear carrier, in first-gear shifting,
  wherein the forward-gear shifting part includes:
    a forward-gear shifting hub fixedly connected to the input shaft to receive the rotational force from the power source;
    a forward-gear shifting sleeve configured to slide on the forward-gear shifting hub and coupled to or decoupled from the planetary gear carrier;
    a forward-gear shifting fork rotatably connected to the forward-gear shifting sleeve;
    a forward-gear shifting fork driving shaft connected to the forward-gear shifting fork such that the forward-gear shifting fork linearly moves; and
    a forward-gear shifting actuator motor configured to rotate the forward-gear shifting fork driving shaft.

11. The transmission system of claim 10, wherein the shifting control unit is configured to:
  control the forward-gear shifting part not to be coupled to the planetary gear carrier; and
  control the reverse-gear shifting part to be coupled to the ring gear carrier, in the reverse-gear shifting.

12. The transmission system of claim 11, wherein the shifting control unit is configured to:
  control the forward-gear shifting part to be coupled to the planetary gear carrier; and
  control the reverse-gear shifting part not to be coupled to the ring gear carrier, in second-gear shifting.

13. The transmission system of claim 12, wherein the rotation control part acts in a non-operating state with respect to the ring gear, which intends to rotate in the one direction of the ring gear, to allow the ring gear to rotate in the one direction, in the second-gear shifting.

14. The transmission system of claim 12, wherein the shifting control unit is configured to:
  in the first-gear shifting, control the rotation control part to be positioned in contact with the ring gear;
  in the second-gear shifting, control the rotation control part to be positioned not in contact with the ring gear; and
  in the reverse-gear shifting, control the rotation control part to be positioned not in contact with the ring gear, and control the reverse-gear shifting part to be coupled to the ring gear.

15. The transmission system of claim 11, wherein the rotation control part acts in a non-operating state with respect to the ring gear, which intends to rotate in the one direction, to allow the ring gear to rotate in the one direction while restricting rotation of the ring gear as the reverse-gear shifting part is coupled to the ring gear carrier, in a state that the forward-gear shifting part is not coupled to the planetary gear carrier and the reverse-gear shifting part is coupled to the ring gear carrier, in the reverse-gear shifting.

16. The transmission system of claim 10, wherein the rotation control part acts in an operating state with respect to the ring gear, which intends to rotate in a direction different from the one direction of the ring gear, to interrupt the ring gear from rotating in a different direction such that rotation of the ring gear is restricted, in the first-gear shifting.

17. The transmission system of claim 10, wherein the reverse-gear shifting part includes:
- a reverse-gear shifting hub rotatably connected to the output shaft, wherein the output shaft is fixedly connected to the planetary gear carrier;
- a reverse-gear shifting sleeve configured to slide on the reverse-gear shifting hub and coupled to or decoupled from the ring gear carrier;
- a reverse-gear shifting fork rotatably connected to the reverse-gear shifting sleeve;
- a reverse-gear shifting fork driving shaft connected to the reverse-gear shifting fork such that the reverse-gear shifting fork is linearly movable; and
- a reverse-gear shifting actuator motor configured to rotate the reverse-gear shifting fork driving shaft.

18. The transmission system of claim 10, wherein the rotation control part is a one-way clutch.

* * * * *